United States Patent Office 3,533,567
Patented Oct. 13, 1970

3,533,567
APPARATUS FOR SIMULTANEOUS OSCILLATORY TREATMENT OF SUBSTANCES OR MIXTURES THEREOF
Peter Willems, Steinhofhalde 20–22, Lucerne, Switzerland
Filed June 26, 1967, Ser. No. 648,695
Claims priority, application Switzerland, June 25, 1966, 9,225/66
Int. Cl. B02c 18/06, 19/18, 13/10
U.S. Cl. 241—163
2 Claims

ABSTRACT OF THE DISCLOSURE

A two-stage kinematically operated high frequency generator wherein each stage comprises at least a pair of cooperating, relatively rotating rows of members in a common pressure housing between which members of each row of cavities are defined. The first stage is located radially inwardly of the second stage and acts to comminute and accelerate substance (e.g., fibrous material, fed under pressure thereto) to the second stage where the substance receives further comminuting treatment to its desired end condition. Not only is the comminution effected, for example, by shearing and rebounding, but oscillations are propagated through the particles by the pulsating feeding effect of the relatively moving chambers at sonic and/or ultrasonic frequency and increasingly bring the substance to the desired degree of treatment.

BACKGROUND OF THE INVENTION

The present invention concerns an apparatus for the simultaneous mechanical and vibratory (oscillatory) treatment of substances or mixtures of substances, particularly for the purpose of decomposition, dispersion, separation into fibers, homogenization, emulsification, loosening, drawing out or similar treatment for starting or accelerating chemical reactions of different kinds between more or less reactive materials or compounds and/or for improving other similar processes in the chemical industry. The apparatus of the present invention is intended particularly for the treatment of such substances or mixtures thereof which can be processed by known methods and in known apparatus only with difficulty and involving lengthy treatment, usually only with an imperfectly achieved result.

SUMMARY OF THE INVENTION

One object of the present invention is the fiber separation which is necessary or advantageous in the preparation of fibrous substances for the manufacture of paper or other fiber pulp bodies. By "fibrillation" the formation of fibrils and microfibrils is to be understood in this case, the fibrils either remaining connected at one end to the base material from which they branch or are branched, and also the formation of independent fibrils which are completely separated from their base material and are either monofilar, branched or flake—like structures; in the flakes may be perceived by the use of suitable magnification.

Another object is that, despite the very intensive processing of the substance mixture employed in the method, the fibers and, if possible, the fibrils obtained must not be shortened in length and must be kept unchanged as far as possible in their morphological structure, any wet swelling (hydration) of the fibers, however, being excepted.

A further object is the dispersion of coarse lumpy conglomerations which are very cohesive in their structure. For example, the processing of cellulose into viscose, e.g. for the formation of synthetic fibers, leads to the formation of lumps and conglomerations during the xanthogenising, and further processing necessitates the use of a special comminuting device to break up the lumps.

Since, as is well known, the cellulose which has been thus treated contains heterogeneous molecular structures (also called molecule knots) which during homogenizing opposes considerable resistance to treatment when carried out with known apparatus, undesirable side effects occur during the necessary protracted processing, such as heating and volatilizing of solvents which, in turn, lead to sticky blockages during processing.

The apparatus of the present invention is particularly suitable for carrying out very difficult processes which include not only changes of the structure but also chemical reactions, that is, contact processes of very different kinds. Such processes are rendered possible, by the high-frequency vibration, i.e. by processing the material concerned with high-frequency pulses or waves, setting the material with intensive oscillation in the sonic and/or ultrasonic ranges.

In a known method employing kinematically operating high frequency generators producing sound and ultrasound, as for example, according to U.S. Pat. No. 3,062, 457, difficulties frequently occur, since particularly difficult substances such as synthetic fibers lead to blockages in the generator employed. These blockages usually occur in the closely spaced series of sound chambers. After many years of experiments it is still not possible to process synthetic materials in one operation, to the desired degree of fiber separation or fibrillation by a kinematic generator.

In the course of extensive experiments, the applicant has found that the described difficulties can be avoided.

The apparatus of the present invention coarsely homogenizes the substance in a first working stage and effects the further treatment of the substance to its desired end condition in at least one additional working stage, each of the working stages utilizing a kinematically operating high frequency generator and being carried out successively in a common pressure space without reversal of direction of the pulsating feed of the substance.

Such a rotary generator consists of a pressure housing on which a center injection pipe is mounted for the crude fibrous material; this supply pipe communicates with a central supply chamber within the pressure housing. The supply chamber is surrounded by a rotating disc which can be rotated at high speed by a central shaft. The rotating disc is provided at relatively large peripheral intervals with removable and replaceable and at least approximately radially directed, members, the radial extension of which is comparatively long, to provide a high centrifugal acceleration to the pulp fed in from the center supply chamber. Around the ring of accelerating members is a ring of similar members enclosing the former with a slight clearance, and rotating oppositely to the first ring, or stationary. It is detachably secured, preferably by a supporting disc mounted on the pressure housing or part thereof, so that the members of the outer ring can be removed, if necessary, or individually replaced.

If, however, very resistant fibrous materials, such as synthetic fibrous materials, are treated in such a sonic generator, as in the form of an aqueous suspension, blockages very easily occur, as already mentioned, particularly in the external, more finely divided ring of members, as a consequence of which the fibers are kept back and act as a filter so that only the water from the fiber suspension can penetrate to further external rings of members, and finally, the friction caused by the blocked fibers stops the generator.

The apparatus for carrying out the present invention is constructed so that such breakdowns cannot occur; it is characterized by the feature that at least two kinematically operating high frequency generators are mounted in series in a common pressure housing having at least one inlet and one outlet, each of the generators forming at least one working stage and having at least one means to drive cooperating rows of members in opposite direction, the polar distances of the rows of members increasing with the number of stages.

DESCRIPTION OF THE PREFERRED EMBODIMENTS

Figure 1:
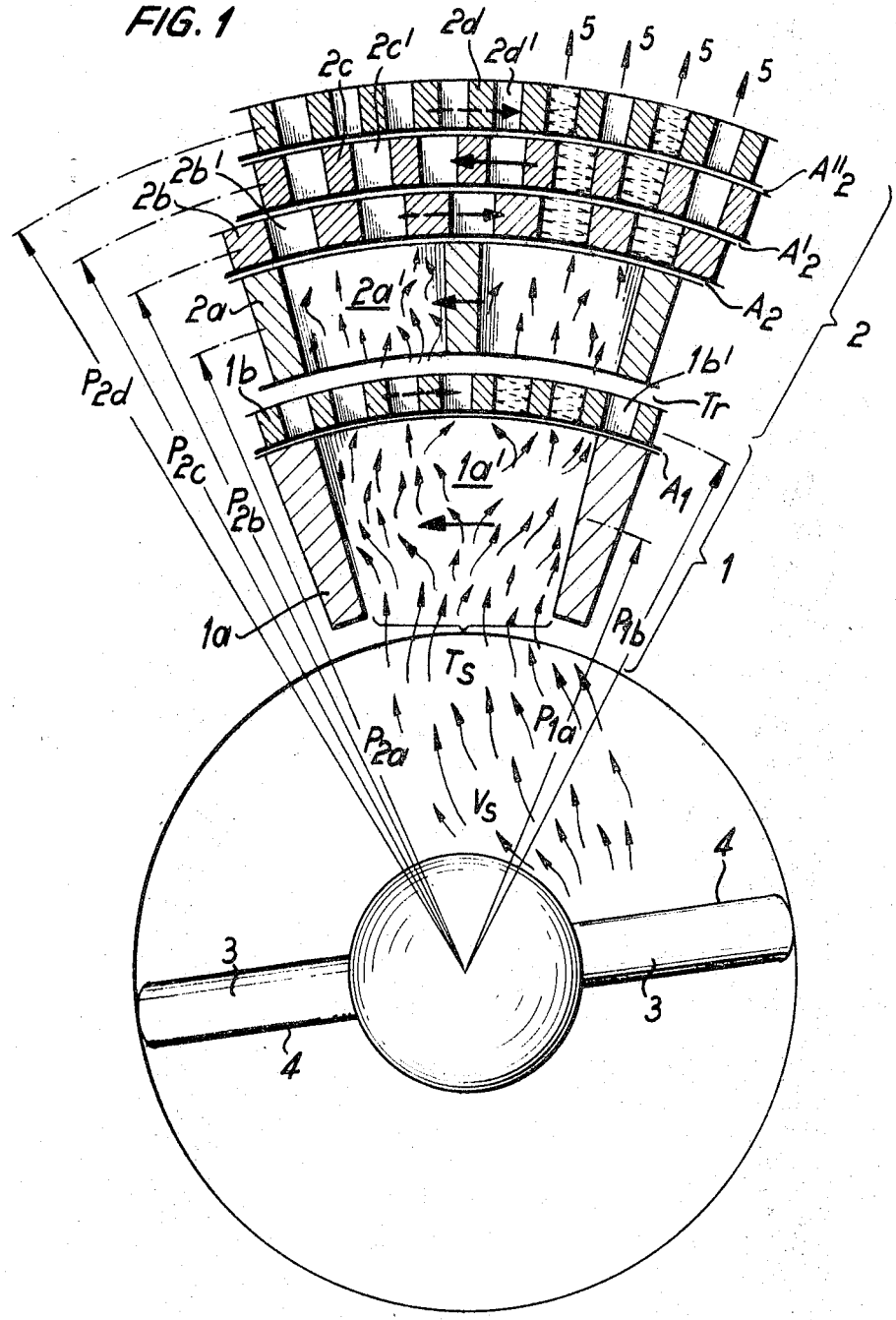
FIG. 1 is a partial cross-section through an apparatus having rotary generators, with the housing being omitted for clarity of disclosure.

The embodiment of the apparatus of the present invention shown in FIG. 1 of the drawings comprises two kinematically operating high frequency generators 1, 2 mounted in series in a common pressure housing (not known). The first generator comprises one and the second geneartor three working stages. The first generator 1 consists of an initial ring of members $1a$ arranged with a large peripheral clearance between them. The first ring is enclosed by a second ring of members $1b$, the peripheral clearance of which is much smaller and between which small cavities $1b^1$ acting as sound chambers exist.

The first members $1a$ are arranged with a comparatively large spacing between them, and divide the full pulp flow $Vs$ introduced into the generator 1, into individual, comparatively large component flows $Ts$ and accelerate the latter. Under the acceleration pressure in the working gap $A_1$ between the two rings of members the particles of pulp in each stream $Ts$ are pushed through the sound chambers $1b^1$ of the second ring $1b$ constructed in the embodiment shown as a stator, and enclosing the ring $1a$. The second ring of members $1b$ is much more closely divided and its sound chambers $1b^1$ are designed with a smaller volume than the spaces $1a^1$ between the members $1a$ of the first ring. The construction described so far represents a single-stage generator as described in my U.S. Pat. No. 3,062,457. It comprises an initial ring of members having comparatively large pumping flanks and comparatively large peripheral gaps which divide the main flow introduced into the generator through a supply chamber, into a plurality of component streams which are highly accelerated by the first row of members and pass with a high frequency pulse action through the members and sound chambers of the second row. The particles of at least approximately the same size impinging on the inlets of the sound chambers of the second row, previously separated at high frequency from the component flows of the first row of members, are pulverised or comminuted and acted on by the pulses of high frequency pressure occurring with the intake of each particle into the inlet of a sound chamber of the second row which is already filled with particles and subjected to counterpressure, after which intense pulses in the sonic or ultrasonic range are propagated in the direction of travel of the substance in the sound chambers as intense waves, and act in the described manner on the particles subjected to counterpressure in the chambers and forced to remain there for the appropriate time.

The substance treated in this manner is impelled intermittently at high frequency by the high frequency pulses through the sound chambers in the direction of the outlets of the latter, and at the ends of the sound chambers the substance is exhausted; thereby the work of the first generator which effects the necessary preparation of the pulp is concluded without the occurrence of blockages.

Normally the substance prepared in this manner in one passage is conveyed to an intermediate container and, according to the desired end state, passed a second time through the generator. By this intermediate storage and repass through the intermediate container (for improved effect two containers are disposed one above the other or, in the case of one-story installations, connected together by a reversing pump) naturally considerable work is involved which is unnecessary with the present invention.

As a result of protracted experiments it was discovered that the production of the method using a generator according to U.S. Pat. No. 3,062,457 dropped considerably after only a few minutes and in a short time completely stopped, owing to blockages, so that in the case of very resistant substances processing times up to 15 times longer (or expressed otherwise: $15 \times 3 = 45$ secs. time of transit of the substance through the generator) were necessary which was obtained by reducing output, and the repassing through the intermediate container required about 20 minutes extra for hard, synthetic fibers, so that in the case of 10 passages, apart from the actual necessary duration and processing time of the substance in the actual process and in the generator employed, of only 1 to 2 seconds per passage, that is to say about 10–20 seconds all told, due to the necessary by-passing by way of intermediate containers, pipelines, valves etc., a total processing time of $10 \times 20$ minutes, i.e., 200 minutes or 3 hours and 20 minutes resulted.

The apparatus of the present invention considerably shortens the working time and simultaneously improves the duration and quality of the processing of the substance by the arrangement of a second and, possibly, other generators in series in the same casing.

With the high frequency expulsion of the particles of substance from the peripheral sound chambers of the first generator, the issuing substance is suddenly relieved. This relief is assisted by the members on the inner periphery of the second generator, that is between the engagements of the members accelerating the substance again, due to the intermediate spaces which are not interrupted therein and their correspondingly larger cross-section, simultaneously with the suction towards the periphery. This loosening of the substance results in the loosening of particles which have been pressed together so that the second generator can begin its work more easily and efficiently. In particular the substance processed in a passage through the first generator, no longer leads to blockage of the second generator as was the case with known systems. The members of the second generator engaging between them the substance in the cavities thus accelerate the substance again and press the material against the inlets of the sound chambers already filled with particles of substance so that in passing of the particles of substance on the edges of the walls separating the sound chambers, the edges moving in a direction counter to the movement of the material corresponding with the travel time of the material, small particles of at least approximately the same size are pressed in with high intensity the sound chambers at high frequency and also high primary pulses are produced, the energy of which is propagated as oscillations through the particles in the sound chambers, towards each chamber outlet and act on the substance at sonic and/or ultrasonic frequency and increasingly bring it to the desired degree of treatment.

The embodiment shown comprises a second generator 2 consisting of two rotors $2a$, $2c$ and two stators $2b$, $2d$ driven at the same speed as the rows of members $1a$. The members $2a$ have a peripheral clearance from each other which is somewhat smaller than the peripheral clearance of the members $1a$ of the first generator 1. The cavities $2a^1$ between each two adjacent members $2a$ act as whirling and homogenizing chambers. The tangential thickness of the members and the volume of the sound chambers of the rows of members $2b$, $2c$, $2d$ reduce towards the periphery of the second generator 2, whereby at the same time the oscillation frequencies occurring when the apparatus is in operation increase towards the periphery from one row of members to the other.

FIG. 1 shows by flow lines how the full substance flow $V_s$ which before if flows into the supply chamber, is continuously interrupted by the rotating blades 3 provided with cutters 4 and flows into the cavities $1a^1$ between the rotor members $1a$ and is thereby divided into components flows $T_s$. The substance of each component flow $T_s$ is accelerated (being simultaneously more or less compressed) and passes under the accelerating pressure through the working gap $A_1$, being subjected to shearing, rebounding, fine grinding and, if desired, cavitation and, in the sound chambers $1b^1$ into which it is intermittently forced by high frequency, subjected to an oscillation treatment. The work in the generator 1 serves for the coarse preparation of the raw substance (crude substance) to avoid blockages caused by the formation of solid conglomerations in the common separating gap $T_r$ between the generator 1 and the generator 2. The width of the working gap $A_1$ in the first generator should therefore be calculated to effect a preparation of the substance into particles or fiber lengths which render impossible the blockage of the series of members $1b$, that is, the formation of a "filter ring" in the working gap $A_1$; practical tests have shown that for this purpose a width of gap of approximately 0.5 to 2 mm., preferably 0.8 to 1.5 mm., is very advantageous.

With the intermittent high frequency expulsion of the substance from the generator 1, i.e. from the periphery of the sound chamber $1b^1$ in an approximately radial direction, the work of the first generator 1, namely the coarse initial processing of the substance for avoiding blockages, is concluded.

While the generator 1 represents an initial comminution or initial preparation apparatus the generator 2 is an apparatus producing the finished substance. Between these two devices used for achieving separate objects, is the common separating gap or space $T_r$, the width of which is preferably 2 mm. or more in which—in contrast to the working gap $A_1$—tiny particles of at least approximately the same size are not torn away because no shearing action occurs.

In the second generator 2 the solid particles of initially treated substance are mixed and homogenized by turbulence in the large hollow chambers $2a^1$. This homogenizing is a uniform distribution of the solid particles in the flowing phase of the mixture, for example in an organic solvent or in water (e.g. in fiber suspensions). Simultaneously the substance (not only fibers but all kinds) in the large hollow chambers $2a^1$ is acted on by sound by the oscillations (in the embodiment shown, radially and divergingly) from the sound chambers $1b^1$ propagated in the direction of the out flowing substance and set oscillating. In the three narrow working gaps $A_2$, $A'_2$, $A''_2$ of the second generator 2 the tearing away of tiny particles of at least approximately the same size is resumed, but with greater intensity than in the first generator 1, for which purpose these three working gaps $A_2$, $A'_2$ and $A''_2$ may be made smaller than the working gap $A_1$ of the first generator 1, preferably from 0.5 mm. reducing down to, if necessary, 0.1 mm. according to the nature of the substance, its sensitivity to sound radiation and the desired end result which may dictate for many purposes particle sizes of less than 1. The working gaps $A_2$, $A'_2$, $A''_2$ can be allowed to become progressively smaller or they may all be of the same size. Obviously the first generator 1 with certain substances may also be provided with several series of members or working gaps, according to the nature of the substance treated. The upper limit for the number of gaps in the first generator is always decided by the necessary elimination of the risk of blockage which increases with the number of working gaps. In general only one working gap is sufficient in generator 1. The substance is subjected to a preferably increasingly intensive oscillation treatment in the sound chambers $2b^1$, $2c^1$ and $2d^1$; the oscillations occurring in the sound chambers—as also those in the sound chambers $1b^1$ of the first generator 1—are indicated by zigzag lines, while the curved lines of arrows in the whirling and homogenizing chambers $2a^1$ are intended to show the intensive turbulence. The prepared substance issuing from the sound chambers $2d^1$ of the outermost row of members $2d$ in the direction of the arrows 5 is—if desired, after flowing through a collecting passage surrounding the said row of members—discharged through an outlet into a container or a pipeline. This outlet is preferably constructed as a regulating device for the counterpressure and duration, for example, as a regulating valve; instead of such a device, other equivalent means may be provided, for example, a suitably constricted outlet, an iris diaphragm or a rising pipe attached to the outlet and leading to a higher container. By fitting closable outlet sockets at various levels of the rising pipe a counterpressure can be adjusted to any desired degree. The adjustable counterpressure and duration regulating device may be manually or automatically operated.

As clearly shown by FIG. 1, the polar distances $P_{1a}$, $P_{1b}$, $P_{2a}$, $P_{2b}$, $P_{2c}$, $P_{2d}$, of the relative opposite members of the generators 1, 2 increase with the number of stages.

Figure 2:
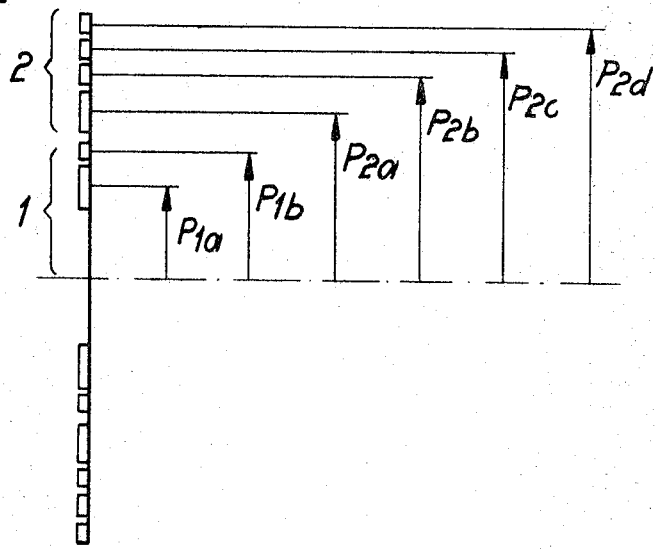
FIG. 2 is a schematic view of the arrangement of the individual rings of members of the apparatus according to FIG. 1, showing the polar distances.
Figure 3:
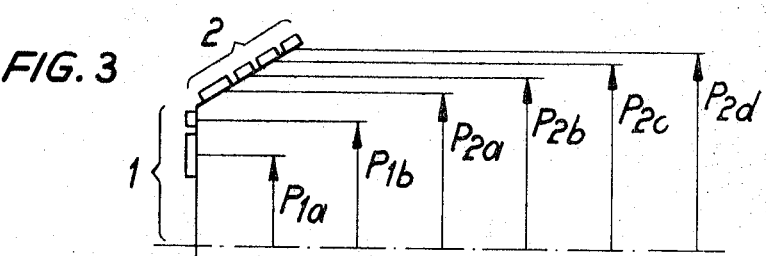
FIGS. 3 and 4 are schematic views of other possible arrangements of the rings of members of the same apparatus.
Figure 4:
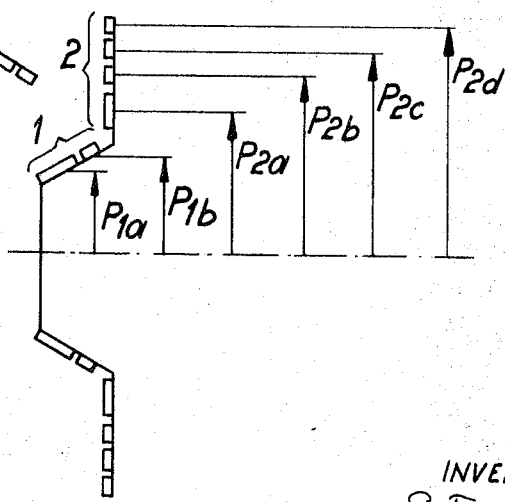
Figure 5:
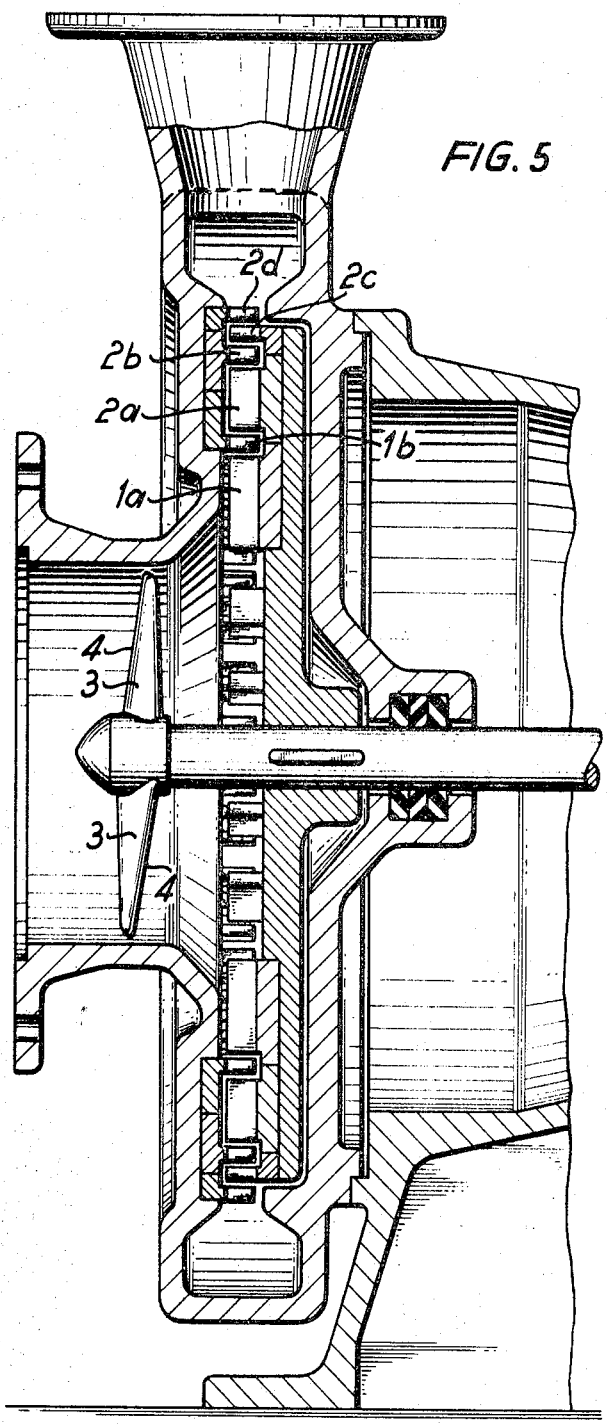
FIG. 5 is a partial longitudinal section through the apparatus according to FIG. 1, shown on a smaller scale.
Figure 6:
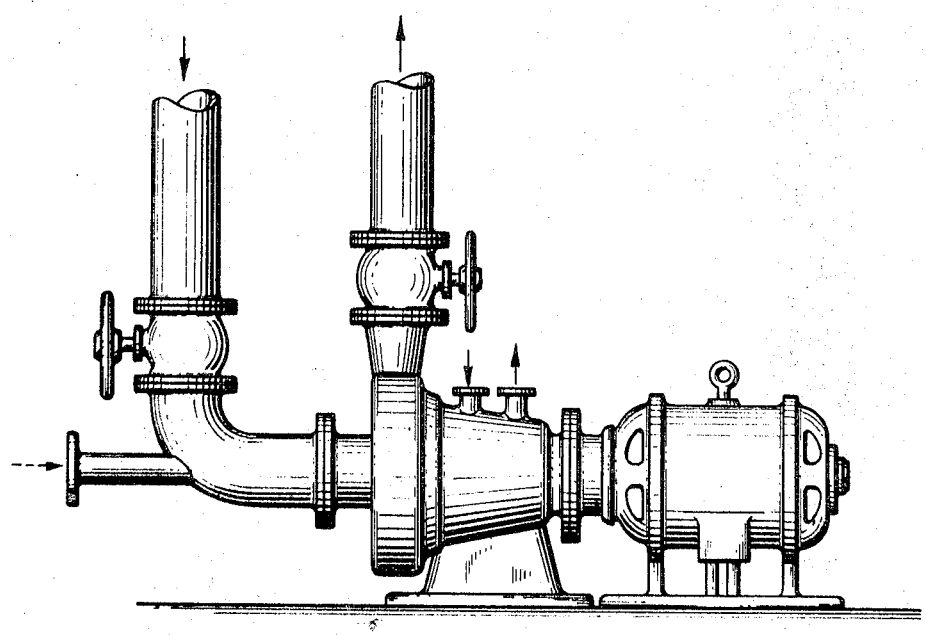
FIG. 6 is a side view of the apparatus according to FIGS. 1 and 5, having inlet and outlet valves and driving motor, also on a reduced scale.

FIG. 2 shows schematically the arrangement of the individual rows of members of the generators 1 and 2 with the corresponding polar distances. Schematic illustration of other possible arrangements of a device consisting of two generators 1, 2 with the same number of rows of members are shown by FIGS. 3 and 4.

Towards the periphery of the second generator 2 the sound chambers may be very narrow, if necessary, and the members limiting the sound chambers reduced in their peripheral dimensions to an admissible minimum determined by the building material. The resultant increasingly smaller division of the members and sound chambers towards the periphery of the second generator also results in a correspondingly rising overall frequency of each individual row of members and a more intensive treatment of the particles of substance or fibers.

As already stated above, the method described in U.S. Pat. No. 3,062,457 demands much slower processing times as a result of the increasing blockage, particularly in the associated rows of members. According to the present invention for carrying out the treatment of very resistant pulps, such as for example, synthetic viscose or cuprama fiber suspensions the following important advantages are unexpectedly obtained:

(a) Due to the initial treatment in the first generator 1 forming a working stage, the pulp is prepared to such an extent that as it leaves the periphery of the second row of members $1b$ it is homogenized in a suitably large chamber $2a^1$ by the powerful turbulence that each sound chamber $2b^1$ of the next row of members $2b$ associated with the second generator 2 receives an initially homogenized mixture of material. The pulp thoroughly mixed in the chamber $2a^1$ by powerful turbulence and considerably homogenized by the resultant rebounding and friction is pressed strongly against the inlets of the sound chambers $2b^1$ of the row of members $2b$ of the second generator 2 on the leading flank of each pumping and compressing member $2a$ of the second generator 2, and as it impinges on the edges of the members limiting the inlets is cut up into particles according to the size of the inlet and the relative spacing between the sound chambers.

Apart from the oscillation energy propagated through the pump in the sound chambers in the direction of the intermittent pulp feed, conventional sound radiation of the particles of pulp in the sound chambers can be produced in at least one row of members transversely to the intermittent pulp feed by walls, which may be set oscillating, of the members tangentially limiting the sound chambers. The advantages of such sound radiation acting on the pulp in two crosswise directions have become apparent in extensive experiments, particularly in the case of very resistant pulps, such as for example, hard natural and particularly synthetic fiber suspensions, as also numerous pulps from organic and inorganic chemistry, such as metal oxdies, minerals and the like.

(b) Compared with the above mentioned extremely long duration of the processing of the pulp, as a result of increasing blockages (up to more than 200 minutes) the time for processing the pulp according to the process of the present invention, using two generators arranged in series in a pressure housing, amounts to only one to five seconds, that is to say only a 12,000th part of the previous processing time.

(c) It has become apparent in the industrial processing of very resistant substances that, due to the increasing blockage (frictional resistances) between the rows of members of the hitherto employed sound radiating device, the consumption of energy, starting at 60 kw. in an initial production of 1,200 kg./hour synthetic fibers increased to 120 kw., the production simultaneously dropping down to only 50 kg./hour. In contrast to this, in carrying out the same processing of the same substance according to the process of the present invention, it has become apparent that the consumption of power begins at 60 kw. and did not rise with a constant output (1,000 kg./hour).

(d) In industrial practice it has become apparent that the substance processed according to the present invention was of excellent quality even when there were difficult physical or chemical problems to be solved, the said quality leading to rapidly increasing use of the process of the present invention in many spheres of chemistry. Compared with other systems superiority was achieved if the pumping members on the working gap are of at least the same peripheral thickness as the peripheral width of the inlet to the associated sound chamber and, at the most, the peripheral thickness of the peripheral dimensions of a sound chamber inlet together with that of the two members tangentially limiting the sound chamber.

The described apparatus may be modified or designed in any way within the scope of the present invention.

For example, the direction of rotation and/or the speed of rotation of one, several or all of the rotating rows of members of the generator or generators associated with the first generator may be different from that of the pumping and compressing members of the first generator. In order to render possible such a counter, leading or following flow, it is only necessary to mount the driving shaft of the last generator in the driving shafts of the series-connected generators constructed as hollow shafts. The drive of the individual shafts may be obtained individually or from a common driving motor with the interposition of one or more, preferably infinitely variable driving gears, if necessary, in conjunction with a turning gear.

The apparatus of the present invention may be formed as a twin or double device, the inlet of the substance occurring on both sides.

I claim:

1. An apparatus for simultaneous mechanical and oscillatory treatment of substances or mixtures of substances, comprising in combination
    a common pressure housing having at least one inlet and one outlet,
    at least a first and second kinematically operating high frequency generator mounted in series in said common pressure housing and each generator comprising at least two cooperating rows of members, each of said rows of members lying in a common plane, and adjacent of said members in each of said rows being spaced apart and defining cavities therebetween,
    each of the said generators constituting at least one working stage,
    at least one means for said generators for driving said cooperating rows of members in opposite directions relative to each other,
    said first and second generator being spaced apart so as to define a common separating gap free from shearing action, and
    said common separating gap communicating directly into the cavities between said members of an adjacent first row of said second generator.

2. The apparatus, as set forth in claim 1, wherein the polar distances of successive of said at least two cooperating rows of members increase with the number of said working stages.

References Cited

UNITED STATES PATENTS

| 250,125 | 11/1881 | Bennett | 241—188 XR |
| 2,882,149 | 4/1959 | Willems | 241—162 XR |
| 2,911,981 | 11/1959 | Bauer. | |
| 3,003,707 | 10/1961 | Lecher | 241—1 |
| 3,062,457 | 11/1962 | Willems | 241—1 |
| 3,125,305 | 3/1964 | Willems | 241—261 |
| 3,190,567 | 6/1965 | Willems | 241—261 XR |
| 3,194,540 | 7/1965 | Hager | 241—86 XR |

ROBERT C. RIORDON, Primary Examiner

D. G. KELLY, Assistant Examiner

U.S. Cl. X.R.

241—301